(12) United States Patent
Sacripante et al.

(10) Patent No.: US 7,501,150 B2
(45) Date of Patent: Mar. 10, 2009

(54) EMULSION AGGREGATION PROCESS FOR FORMING POWDER COATING COMPOSITIONS, POWDER COATING COMPOSITIONS AND METHOD FOR USING THE SAME

(75) Inventors: Guerino G. Sacripante, Oakville (CA); Hadi K. Mahabadi, Mississauga (CA); Patricia A. Burns, Milton (CA); Dan A. Hays, Fairport, NY (US); Kip L. Jugle, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 829 days.

(21) Appl. No.: 10/765,327

(22) Filed: Jan. 28, 2004

(65) Prior Publication Data

US 2005/0165133 A1 Jul. 28, 2005

(51) Int. Cl.
*B05D 7/24* (2006.01)
*B05D 3/02* (2006.01)

(52) U.S. Cl. .................. 427/195; 427/375; 427/386

(58) Field of Classification Search ............ None
See application file for complete search history.

(56) References Cited

U.S. PATENT DOCUMENTS

| | | | | |
|---|---|---|---|---|
| 2,803,177 | A | * 8/1957 | Lowrie | 399/152 |
| 3,028,251 | A | * 4/1962 | Nagel | 427/185 |
| 3,590,000 | A | 6/1971 | Palermiti et al. | |
| 3,655,374 | A | 4/1972 | Palermiti et al. | |
| 3,720,617 | A | 3/1973 | Chatterji et al. | |
| 3,800,588 | A | 4/1974 | Larson et al. | |
| 3,864,322 | A | 2/1975 | Yallourakis | |
| 3,944,493 | A | 3/1976 | Jadwin et al. | |
| 3,983,045 | A | 9/1976 | Jugle et al. | |
| 4,007,293 | A | 2/1977 | Mincer et al. | |
| 4,079,014 | A | 3/1978 | Burness et al. | |
| 4,394,430 | A | 7/1983 | Jadwin et al. | |
| 4,560,635 | A | 12/1985 | Hoffend et al. | |
| 5,153,239 | A | 10/1992 | Kitagawa et al. | |
| 5,300,595 | A | 4/1994 | De Cock et al. | |
| 5,527,658 | A | * 6/1996 | Hopper et al. | 430/137.14 |
| 5,593,807 | A | * 1/1997 | Sacripante et al. | 430/137.14 |
| 5,853,943 | A | 12/1998 | Cheng et al. | |
| 5,928,830 | A | 7/1999 | Cheng et al. | |
| 5,945,245 | A | 8/1999 | Mychajlowskij et al. | |
| 5,994,020 | A | * 11/1999 | Patel et al. | 430/137.14 |
| 6,140,430 | A | 10/2000 | Ruth et al. | |
| 6,143,457 | A | 11/2000 | Carlini et al. | |
| 6,197,883 | B1 | 3/2001 | Schimmel et al. | |
| 6,218,483 | B1 | 4/2001 | Muthiah et al. | |
| 6,228,941 | B1 | 5/2001 | De Cock et al. | |
| 6,280,798 | B1 | 8/2001 | Ring et al. | |
| 6,458,501 | B1 | 10/2002 | Cheng et al. | |
| 6,491,973 | B1 | 12/2002 | Davydov et al. | |
| 6,547,869 | B2 | 4/2003 | Witt | |
| 6,566,433 | B1 | 5/2003 | Ochsner et al. | |
| 6,582,873 | B2 | 6/2003 | Jiang et al. | |
| 6,599,992 | B1 | 7/2003 | Brunmair et al. | |
| 6,635,721 | B1 | 10/2003 | Moens et al. | |
| 6,680,082 | B2 | 1/2004 | Chou et al. | |

FOREIGN PATENT DOCUMENTS

| | | |
|---|---|---|
| DE | 198 04 281 A 1 | 8/1999 |
| EP | 0 939 143 A1 | 9/1999 |
| EP | 1 055 694 A2 | 11/2000 |
| EP | 1 111 012 A1 | 6/2001 |
| GB | 1442835 | 7/1976 |
| GB | 1 474 596 | 5/1977 |
| JP | A 2000-160061 | 6/2000 |
| JP | A 2001-123110 | 5/2001 |
| WO | WO 94/10221 | 5/1994 |
| WO | WO 94/11446 | 5/1994 |

OTHER PUBLICATIONS

Co-pending U.S. Appl. No. 10/765,146, filed Jan. 28, 2004.

* cited by examiner

*Primary Examiner*—William Phillip Fletcher, III
(74) *Attorney, Agent, or Firm*—Oliff & Berridge, PLC

(57) ABSTRACT

A process for forming curable powder comprises providing an aqueous dispersion of particles of curable resin and optionally particles comprising at least one curing agent; aggregating the particles optionally with the curing agent to form aggregated particles; coalescing the aggregated particles to form fused particles; and removing the fused particles from the aqueous dispersion. By the process, a curable powder is formed. The curable powder may be used in powder coating.

28 Claims, No Drawings

EMULSION AGGREGATION PROCESS FOR FORMING POWDER COATING COMPOSITIONS, POWDER COATING COMPOSITIONS AND METHOD FOR USING THE SAME

BACKGROUND OF THE INVENTION

1. Field of Invention

The invention relates to a process for forming a powder coating composition, and more specifically to an emulsion aggregation and coalescence process for the preparation of powder coating compositions.

2. Description of Related Art

Powder coatings form a rapidly growing sector of the coatings market. Powder coatings are utilized for either decorative purposes or protective purposes or both. For decorative purposes, color, gloss, and appearance may be the primary attributes. Most decorative coatings are thin coatings mainly using thermoset coatings. For protective purposes, the coatings should have longevity, corrosion protection, impact resistance properties and serve as insulation. In this latter role, the coatings should be thick and can be applied in powder form.

Powder coating materials are solid compositions which are generally applied by an electrostatic spray process in which the powder coating particles are electrostatically charged by the spray gun and the substrate (normally metallic) is earthed. The charge on the powder coating particles is normally applied by interaction of the particles with ionized air (corona charging) or by friction (tribostatic or "tribo" charging). The charged particles are transported in air towards the substrate and their final deposition is influenced inter alia by the electric field lines that are generated between the spray gun and the work piece, as well as the space charge electric field from the charged powder cloud.

Powder coating compositions also may be applied by fluidized-bed processes, in which the substrate work piece is preheated (typically to 200° C.-400° C.) and dipped into a fluidized bed of the powder coating composition. The powder particles that come into contact with the preheated surface melt and adhere to the work piece. In the case of thermosetting powder coating compositions, the initially-coated work piece may be subjected to further heating to complete the curing of the applied coating. Such post-heating may not be necessary in the case of thermoplastic powder coating compositions.

Another alternative application technique for powder coating compositions is the so-called electrostatic fluidized-bed process, in which the fluidizing air is ionized by means of charging electrodes arranged in the fluidizing chamber or, more usually, in the plenum chamber below the porous air-distribution membrane. The ionized air charges the powder particles, which acquire an overall upwards motion as a result of electrostatic repulsion of identically charged particles. The effect is that a cloud of charged powder particles is formed above the surface of the fluidized bed. The substrate work piece (earthed) is introduced into the cloud and powder particles are deposited on the substrate surface by electrostatic attraction. No preheating of the substrate work piece is required.

The processes described above generally employ powder compositions obtained by extrusion and pulverization methods. Powder compositions thus produced have numerous drawbacks. The powder compositions consist of irregularly shaped particles in a wide range of sizes.

Powder coating compositions formed by these conventional methods produce coatings that may be unnecessarily thick, due to the size of the particles of the powder coating compositions. In addition, the thickness of these coatings may be non-uniform due to the wide range of particle sizes and the irregular shapes of the particles of the powder coating compositions.

Thus, there exists a need for processes to produce powder coating compositions comprising very small, regularly shaped particles having a narrow range of sizes. There further exists a need for processes for providing a thin film coating of uniform thickness to a substrate by means of a powder coating composition. There also exists a need for a process for forming powder coating composition particles of a small size and narrow size range, with improved economic feasibility. Thus there further exists a need for powder compositions formed chemically in situ and which do not require known pulverization and/or classification methods.

SUMMARY OF THE INVENTION

The present invention is directed to the use of powder formed by emulsion aggregation in powder coating techniques. The present invention includes processes for making powder by emulsion aggregation, powder made by emulsion aggregation, and processes for using powder made by emulsion aggregation in powder coating techniques. Although the present invention is particularly directed to the use of powder in powder coating techniques, it may be possible to use powder made according to the present invention for other purposes. In particular, powder made by emulsion aggregation processes have been used as toner in reprographic engines.

In a particular embodiment, the present invention is directed to an emulsion aggregation process for making powder. The process comprising providing an aqueous dispersion of at least resin particles; aggregating the particles to form aggregated particles; coalescing the aggregated particles to form fused particles; and removing the fused particles from the aqueous dispersion, such as by filtering and drying. In embodiments, the present invention is also directed to powder made by this process.

In embodiments of the invention, the resin is a curable resin. As used herein, a curable resin is a resin that may be cured during a powder coating technique. The curing process may or may not utilize a curing agent that initiates the curing process. As used herein, a curing agent is a chemical that can be added to the powder to initiate curing of the curable resin. The curing agent may be in the powder particles containing the curable resin or dry-mixed in the powder.

In embodiments of the present invention, the powder formed by the emulsion aggregation process further comprises a curing agent. The curing agent may be added to the powder particles during the aggregation step.

In embodiments of the present invention, the powder formed by the emulsion aggregation process further comprises colorant. The colorant may be added to the powder particles during the aggregation step.

In embodiments of the present invention, the powder formed by the emulsion aggregation process further comprises fillers. The fillers may be added to the powder particles during the aggregation step.

In embodiments, the present invention provides powder particles having a volume average diameter of less than 30 microns, preferably from about 3 to about 20 microns, and more preferably from about 3 to about 10 microns. However, bigger or smaller particles can be formed by this process by, for example, changing the reaction time of the aggregation step.

In embodiments of the present invention, the powder formed by emulsion aggregation is loaded into a powder coating applicator. In embodiments, the present invention is directed to a powder coating applicator loaded with powder formed by the processes described herein.

In embodiments, the present invention is directed to a process of powder coating powder made by the processes described herein. In embodiments of the invention, the powder is applied to a conductive surface, such as a metallic surface, to form a coating on the surface. In other embodiments, the powder is coated on a layer on the conductive surface. In embodiments, the powder coating technique includes curing the powder to form a cured coating on the conductive surface. In other embodiments, the powder is melted without being cured.

In embodiments, the present invention provides more environmentally friendly coatings, higher solids loading and/or more uniform coating with less imperfections.

DETAILED DESCRIPTION OF PREFERRED EMBODIMENTS

The present invention is generally directed to powder coating composition processes, and more specifically, to aggregation processes for the preparation of powder coating compositions. Specifically, the invention is directed to the aggregation/coalescence process for making powder particles, by which narrow particle size distribution can be achieved without classification. In this process, resin is prepared as a water-based dispersion of generally sub-micron sized polymeric particles (polymeric latex), which are then aggregated, optionally with dispersions of colorants and/or other additives, which also may be in the form of sub-micron particles, to the desired size and are then coalesced to produce powder particles. In embodiments, the present invention is directed to the economical chemical in situ preparation of powder coating compositions without the use of known pulverization and/or classification methods, and wherein, in embodiments, powder compositions can be obtained in which the particles thereof have a volume average diameter of less than 30 microns, preferably from about 3 to about 20 microns and more preferably from about 3 to about 10 microns, and narrow GSD (geometric size distributions) of, for example, from about 1.10 to about 1.25, preferably from about 1.19 to about 1.23, as measured by a particle sizing apparatus, such as a particle sizing apparatus which makes use of the Coulter principle, such as a COULTER COUNTER.

Specifically, various exemplary embodiments of the present invention are directed to a method of preparing powder particles by providing a latex emulsion of resin, optionally blending the latex emulsion of resin with dispersions of colorants and/or other additives, forming aggregate particles by aggregation, optionally employing an aggregating agent and/or agitation and/or heat, and coalescing the aggregate particles to form fused particles, at a temperature above a glass transition temperature of the resin. The powder particles can be subsequently cooled to a temperature below the glass transition temperature of the resin, optionally washed, isolated, dried and collected. The powder particles can then be loaded into a suitable container and/or used in a powder coating process.

Powder coating compositions generally comprise a solid film-forming resin, optionally with one or more colorants such as pigments, and optionally also containing one or more additives, such as magnetites, fillers, flocculants, curing agents, leveling agents, charge additives, flow-promoting agents, flow-control agents, plasticizers, stabilizers, anti-gassing agents, antioxidants, UV absorbing agents, light stabilizers and waxes.

The bulk of resins used in powder coatings are thermoset resins. These resins typically chemically react during baking to form a polymer network that will generally not re-melt. Thermoset powder coatings for materials or objects of metal are known. Materials utilized in thermoset powder coatings include epoxy resins, polyester resins and acrylic resins.

Thermoplastic resins are also appropriate for some powder coating applications and are generally of high molecular weight and require relatively high temperatures to achieve melt and flow during coating. However, the molecular weight and melt viscosity remain constant during the coating procedure so that the polymer can be easily re-melted for easy repair or touch-up. Thermoplastic coating polymers include, but are not limited to, polyamides, polyolefins, plasticized PVC, polyester and poly (vinylidene fluoride), ionomers, styrenes, copolymers comprising styrene and an acrylic ester, and the like.

Curable resins may be used in various exemplary embodiments of the invention. Non-limiting examples of suitable curable resins include epoxy resins, poly-functional epoxy resins, polyester resins, carboxy-functional polyester resins, hydroxy-functional polyester resins, polyol resins, polycarboxylic acid resins and poly(vinylidene fluoride) resins.

Thus, in various exemplary embodiments, the resin is selected from the group consisting of thermoset resins, curable resins and thermoplastic resins. Specifically, the resin selected is at least one resin chosen from the group comprising epoxy resins, polyester resins, carboxy-functional polyester resins, hydroxy-functional polyester resins, acrylic resins, functional acrylic resins, polyamide resins, polyolefin resins, plasticized PVC, polyester and poly(vinylidene fluoride), and ionomers, and mixtures thereof.

In various exemplary embodiments of the invention, powder coating compositions are prepared using suitable thermoset polymer resins. In various exemplary embodiments of the invention, suitable thermoset powder compositions are adapted from systems such as, for example, carboxyl-terminated branched polyesters in combination with multifunctional epoxy resins, such as those described in U.S. Pat. No. 6,228,941; carboxyl-functionalized acrylic resins compounded with multifunctional epoxy resins, such as those described in Japanese patent application publication JP 2001-123110; epoxy resins or epoxy-functionalized acrylic resins in combination with latent polyfunctional amine catalysts, such as those described in U.S. Pat. No. 6,197,883 and European Patent EP 1 055 694 A2; blocked isocyanates in combination with hydroxyl-functionalized polyesters or acrylics, such as those described in WO 94/10221, Japanese patent application publication JP 2000-160061 and German Patent DE 198 04 281 A1; epoxy functionalized resins in combination with polycarboxylic acid cross-linking agents, such as those described in U.S. Pat. No. 6,218,483; macrocyclic esters, carbonates, amides or imides, ring-opened and polymerized in the present of polyfunctional epoxy resins, such as those described in European Patent EP 1 111 012 A1; mixtures thereof, and the like. The entire disclosures of the above-cited references are incorporated herein by reference.

In various exemplary embodiments of the invention, thermally cross-linkable resins such as carboxyl- and hydroxyl-functionalized polyester and acrylic resins, epoxy resins and epoxy-functionalized acrylic resins, blocked isocyanates, hydroxyl-functionalized polyesters or acrylics, polycarboxylic acid cross-linking agents, macrocyclic esters, carbonates, amides or imides and polyfunctional epoxy resins, which can be obtained commercially, are used. In various exemplary embodiments of the invention, commercially available polyfunctional amine catalysts are used.

The composition may, for example, be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10-100, a number average molecular weight Mn of 1,500 to 10,000 and a glass transition temperature Tg of from 30° C. to 85° C., preferably at least 40° C. The polyepoxide can, for example, be a low molecular weight epoxy compound such as triglycidyl isocyanurate (TGIC), a compound such as diglycidyl terephthalate or diglycidyl isophthalate, an epoxy resin such as a condensed glycidyl ether of bisphenol A or a light-stable epoxy resin. Such a carboxy-functional polyester film-forming resin can alternatively be used with a bis-(beta-hydroxyalkylamide) curing agent such as tetrakis(2-hydroxyethyl) adipamide.

In embodiments, the resin is a polyester, most preferably a sulfonated polyester, which may be formed from any suitable acid and alcohol. Preferably, the polyester is derived from one or more terephthalates and one or more glycols. For example, the polyester may be derived from a reaction that includes, for example, three glycol components. In a most preferred embodiment herein, the polyester is a sulfonated polyester derived from a reaction of dimethylterephthalate, sodium dimethyl 5-sulfoisophthalate, propanediol, diethylene glycol and dipropylene glycol. Additional examples of sulfonated polyesters which may be used in the present invention include those illustrated in U.S. Pat. Nos. 5,593,807 and 5,945,245, the disclosures of which are totally incorporated herein by reference.

As a further possibility, an epoxy resin can be used with an amine-functional curing agent such as, for example, dicyandiamide. Instead of an amine-functional curing agent for an epoxy resin, a phenolic material may be used, preferably a material formed by reaction of epichlorohydrin with an excess of bisphenol A (that is to say, a polyphenol made by adducting bisphenol A and an epoxy resin). A functional acrylic resin, for example a carboxy-, hydroxy- or epoxy-functional resin can be used with an appropriate curing agent. Mixtures of binders can be used, for example a carboxy-functional polyester can be used with a carboxy-functional acrylic resin and a curing agent such as a bis-(beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy- or hydroxy-functional). Such resin combinations may be selected so as to be co-curing, for example, a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy-functional acrylic resin).

Other film-forming thermoset polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins.

In various exemplary embodiments, at least one suitable thermoplastic resin can be used. Illustrative examples of such suitable resins include, for example, thermoplastic resins such as vinyl resins in general or styrene resins in particular, and polyesters. Examples of suitable thermoplastic resins include, but are not limited to, styrene methacrylate; polyolefins; styrene acrylates, such as PSB-2700 obtained from Hercules-Sanyo Inc.; polyesters; styrene butadienes; crosslinked styrene polymers; epoxies; polyurethanes; vinyl resins, including homopolymers or copolymers of two or more vinyl monomers; and polymeric esterification products of a dicarboxylic acid and a diol comprising a diphenol. Other suitable vinyl monomers include, but are not limited to, styrene; p-chlorostyrene; unsaturated mono-olefins such as ethylene, propylene, butylene, isobutylene and the like; saturated mono-olefins such as vinyl acetate, vinyl propionate, and vinyl butyrate; vinyl esters such as esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, and acrylamide; mixtures thereof; and the like. In addition, crosslinked resins, including polymers, copolymers, and homopolymers of styrene polymers, may be selected. As used herein, the term "styrene" refers to styrene per se, as well as styrene containing modifications, such as a-methyl styrene, 3-chlorostyrene, 2,5-dichlorostyrene, 4-bromostyrene, 4-tert-butylstyrene, 4-methoxystyrene, vinyl naphthalene, vinyl toluene, and divinyl benzene.

Copolymers in various exemplary embodiments may also comprise a small amount of one or more additional monomers. In various exemplary embodiments, the copolymer contains at least 90 weight percent of styrene or acrylic or methacrylic monomers according to the present invention. The copolymer may also contain up to 10 weight percent of other monomers. Suitable monomers include, but are not limited to, vinyl esters of aliphatic acids, ethylenically unsaturated carboxylic acids and known cross-linking agents. Suitable ethylenically unsaturated carboxylic acids include, but are not limited to, itaconic acid, maleic acid, fumaric acid, 2-carboxyethyl acrylate (β-CEA), and the like.

Powder particles formed from any of the above resins or combinations of resins in various exemplary embodiments of the invention may or may not be cross-linked. Any suitable cross-linking agent may be used. Suitable cross-linking agents include, but are not limited to, amines, anhydrides, isocyanates, divinyl benzene, divinyl toluene, diacrylates, dimethacrylates, and the like.

The latex emulsion of resin may be formed by forming a latex of at least one resin, selected from those described above, in water. The resin may be prepared in bulk polymerization or by polycondensation process, and wherein the said resin is rendered hydrophilic by incorporation of alkali sulfonated monomers, for instance, as disclosed in the aforementioned U.S. Pat. Nos. 5,593,807 and 5,945,245, and wherein the resin selected preferably contains functional groups that render them dissipatable; that is, they form spontaneous emulsions in water without the use of organic solvents, especially above the glass transition temperature, Tg, of the resin. In other embodiments, the resin selected may require the use of organic solvents miscible with water, followed by emulsification process in water and then followed by stripping the solvent from water to form an aqueous resin dispersion. The latex of suspended resin particles may be comprised of particles which have an average size of from, for example, about 5 to about 500 nm and more preferably about 10 to about 250 nm in volume average diameter, as measured by any suitable device such as, for example, a NiCOMP® sizer. The particles preferably comprise, for example, about 5 to about 40 percent by weight of the latex emulsion.

Alternatively, the latex may be formed by emulsion polymerization. Techniques for emulsion polymerization are known in the art and are described in, for example, U.S. Pat. Nos. 6,458,501 and 5,853,943, each of which is hereby incorporated by reference in its entirety.

U.S. Pat No. 5,853,943 describes the conditions employed in the aggregation and coalescence of toner particles. Specifically, U.S. Pat. No. 5,853,943 discloses blending an aqueous colorant with a latex emulsion comprising polymer particles and a surfactant and heating the emulsion to a temperature below the glass transition temperature of the polymer particles, specifically to a temperature from about 35° C. to about 60° C., to form aggregate particles, which comprise polymer and colorant and optional additives and have a volume average diameter of from about 2 microns to about 20 microns. See U.S. Pat. No. 5,853,943, col. 3, lines 3-14. In addition, the particles may be aggregated at a temperature of from about 25° C. to about 1° C. below the glass transition temperature of the polymer. See U.S. Pat. No. 5,853,943, col. 7, lines 62-65. The aggregate particles may then be heated to a temperature above the glass transition temperature of the polymer particles, specifically to a temperature from about 70° C. to about 100° C., to coalesce the aggregate particles and form mechanically stable particles. See U.S. Pat. No. 5,853,943, col. 3, lines 14-20. In addition, the aggregate suspension may be heated to a temperature of from about 75° C. to about 120° C. to coalesce the particles. See U.S. Pat. No. 5,853,943, col. 7, line 66- col. 8, line 3.

Similarly, U.S. Pat. No. 5,593,807 describes the conditions employed in the aggregation and coalescence of toner particles. Specifically, U.S. Pat. No. 5,593,807 discloses that the size of the particles, and the speed of aggregation, may be controlled by aggregating the particles at a temperature of from about 5° C. to about 25° C. below the glass transition temperature of the polymer. See U.S. Pat. No. 5,593,807, col. 1, lines 60-64; col. 4, lines 62-67. The aggregate particles may then be heated to a temperature above the glass transition temperature of the polymer particles, specifically to a temperature from about 5° C. to about 50° C. above the glass transition temperature of the resin to coalesce the particles. See U.S. Pat. No. 5,593,807, col. 1, line 65-67.

Synthesized acrylic and methacrylic acid-containing acrylic emulsions, glycidyl methacrylate functional acrylic emulsions, carboxylic acid-terminated dissipatable polyester emulsions and commercial epoxy resin emulsions provide materials can also be used.

In various exemplary embodiments of this invention, additional additives may be incorporated, optionally in the form of dispersions, to the latex emulsion of resin prior to aggregation. Additives may be added, in various exemplary embodiments, for any of various reasons, including, but not limited to, providing color, improving charging characteristics and improving flow properties. For example, additives including, but not limited to, colorants; magnetites; fillers, such as calcium sulfate or barium sulfate; flocculates; curing agents; leveling agents, such as silicone; charge additives; flow-promoting agents, such as silicas; flow-control agents; plasticizers; stabilizers, such as stabilizers against UV degradation; anti-gassing and degassing agents, such as benzoin; surface additives; antioxidants; UV absorbers; light stabilizers and waxes may be included. In various exemplary embodiments, where high gloss is desired, powder coating compositions can be formulated free of pigment.

Curing agents which may be mentioned for use in accordance with various exemplary embodiments of the invention include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; alicyclic poly-epoxides such as "EHPE-3150" supplied by Daicel; polyfunctional amines; dicyanodiamide; bisphenol A; bisphenol S; hydrogenated bisphenol; polyphenolics; imidazoles, such as 2-methyl imidazole and 2-phenyl imidazole; betahydroxy-alkylamide; uretdione; and polyfunctional isocyanates, such as 2,4-toluene diisocyanate, 2,6-toluene diisocyanate, alkaline diisocyanates, xylene-diisocyanate, isophorone-diisocyanate, methylene-bis(4-phenyl isocyanate), methylene-bis-(4-cyclohexyl)isocyanate, 3,3'-bitoluene-4-4'-diisocyanate, hexamethylene-diisocyanate, and naphthalene 1,5-diisocyanate; as well as other known or later developed curing agents and initiators.

Colorants incorporated into various exemplary embodiments of the invention include pigments, dyes, and mixtures of pigments with dyes, and the like. For example, various known cyan, magenta, yellow, red, green, brown, or blue colorants, or mixtures thereof are incorporated into powder coating compositions of various exemplary embodiments of the invention. In various exemplary embodiments of the invention, cyan, magenta, or yellow pigments or dyes, or mixtures thereof, are used. The colorant may be, for example, dyes, pigments, mixtures thereof, mixtures of pigments, mixtures of dyes, and the like, although the use of pigments and pigment mixtures is preferred. The colorant preferably has a mean colorant size ranging from about 50 to about 150 nanometers. The pigment or pigments can be used as water-based pigment dispersions in various exemplary embodiments of the invention.

Illustrative examples of colorants, such as pigments, that may be used in the processes of various exemplary embodiments of the present invention include, but are not limited to, carbon black, such as REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. Colored pigments or dyes, including cyan, magenta, yellow, red, green, brown, blue and/or mixtures thereof, may also be used.

Specific examples of pigments added in various exemplary embodiments of the invention, include, but are not limited to, SUNSPERSE 6000™, FLEXIVERSE™ and AQUATONE™ water-based pigment dispersions from SUN Chemicals, phthalocyanine HELIOGEN BLUE L6900™, D6840™, D7080™, D7020™, PYLAM OIL BLUE™, PYLAM OIL YELLOW™, PIGMENT BLUE 1™, available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, CINQUASIA MAGENTATA™ available from E.I. DuPont de Nemours & Company, Pigment Yellow 180, Pigment Yellow 12, Pigment Yellow 13, Pigment Yellow 14, Pigment Yellow 17, Pigment Blue 15, Pigment Blue 15:3, Pigment Red 122, Pigment Red 57:1, Pigment Red 81:1, Pigment Red 81:2, Pigment Red 81:3, and the like. Examples of magentas include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments in the processes of the present invention. Dyes can be used instead of or as well as pigments.

In various exemplary embodiments of the invention, a colorant may be included in known amounts, to achieve a desired color strength. For example, in various exemplary embodiments of the invention, at least one of the above-described dyes and/or pigments, and/or other colorants, is included in a powder coating composition in a suitable amount. In various exemplary embodiments, at least one of the above-described dyes and/or pigments, and/or other colorants, is included in an amount from about 1 to about 20 percent by weight of the powder coating composition. In various exemplary embodiments, the colorant is included in an amount of from about 2 to about 10 percent by weight of the powder coating composition.

A colorant dispersion containing, for example, about 5 to about 50 percent of predispersed colorant in water is added to the latex emulsion of binder is added, with controlled agitation/mixing. A pigment content of <40% by weight of the total composition (disregarding dry blend additives) may be used. Usually a pigment content of 25-30% is used, although in the case of dark colors opacity can be obtained with <10% by weight of pigment. Where appropriate, a filler may be used to assist opacity, whilst minimizing costs.

In various exemplary embodiments of the invention, magnetites are included, either for their magnetic properties, or for the colorant properties, or both. Magnetites that are used in powder coating compositions of various exemplary embodiments of the present invention include, but are not limited to, a mixture of iron oxides ($FeO.Fe_2O_3$), including those commercially available as Mobay magnetites MO8029™, MO8060™; Columbian magnetites; MAPICO BLACKS™ and surface-treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. In various exemplary embodiments of the invention, a magnetite is present in a powder coating composition in an effective amount. In various exemplary embodiments, the magnetite is present in an amount of from about 10 percent by weight to about 75 percent by weight of the powder coating composition. In various exemplary embodiments, the magnetite is present in an amount of from about 30 percent to about 55 percent by weight of the powder coating composition.

The powder compositions of the present invention may also include fillers, such as, for example, quartz; silicates; aluminosilicates; corundum; ceramic fillers; glass; carbonates, such as chalk, kaolin; inorganic fibers and the like; calcium sulfate; barium sulfate; magnesium sulfate; and any other known or later developed filler materials, and are included in amounts suitable to adjust the rheological characteristics of the powder composition.

In various exemplary embodiments of the invention, flocculates are included to aggregate the particles. In various exemplary embodiments, the flocculates are included in an amount from about 0.01 percent to about 10 percent by weight of the powder coating composition. Flocculates used in various exemplary embodiments of the invention include, but are not limited to, polyaluminum chloride (PAC), dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ (available from Alkaril Chemical Company), SANIZOL™ (benzalkonium chloride) (available from Kao Chemicals), and the like.

In various exemplary embodiments of the invention, a charge additive may be used in suitable effective amounts. In various exemplary embodiments, the charge additive is used in amounts from about 0.1 to about 15 percent by weight of the powder coating composition. In various exemplary embodiments of the invention, the charge additive is used in amounts from about 1 to about 15 percent by weight of the powder coating composition. In various exemplary embodiments of the invention, the charge additive is used in amounts from about 1 to about 3 percent by weight of the powder coating composition. Suitable charge additives in various exemplary embodiments of the invention include, but are not limited to, alkyl pyridinium halides, bisulfates, the charge control additives of U.S. Pat. Nos. 3,944,493; 4,007,293; 4,079,014; 4,394,430 and 4,560,635 (the entire disclosures of which are hereby incorporated by reference), negative charge enhancing additives, such as, for example, aluminum complexes, and other charge additives known in the art or later discovered or developed.

Furthermore, the powder compositions of the present invention can also include release or leveling agents such as silicones or suitable waxes for their known effect. In various exemplary embodiments of the invention, a wax may be present in a powder coating composition in an amount of from about 1 percent by weight to about 15 percent by weight, based on the weight of the powder coating composition. In various exemplary embodiments, the wax is present in the powder coating composition in an amount of from about 2 percent by weight to about 10 percent by weight, based on the weight of the powder coating composition for the known effect of waxes. Suitable waxes include, but are not limited to, polypropylenes and polyethylenes (commercially available from Allied Chemical and Petrolite Corporation); Epolene N-15 (commercially available from Eastman Chemical Products, Inc.); Viscol 550-P, a low weight average molecular weight polypropylene (available from Sanyo Kasei K.K.); mixtures thereof, and the like. The commercially available polyethylenes selected possess, for example, a weight average molecular weight of from about 1,000 to about 1,500, while the commercially available polypropylenes utilized are believed to have a weight average molecular weight of from about 4,000 to about 7,000. Many of the polyethylene and polypropylene compositions useful in the present invention are illustrated in British Patent 1,442,835, the entire disclosure of which is incorporated herein by reference. Suitable silicone leveling agents include, but are not limited to, resin such as dialkyl polysiloxane with terminal functionality selected from the group consisting of amino, hydroxyl, carboxyl, carbinol, (meth)acrylate, halo alkoxy, hydride, haloalkyl, mercapto, acid anhydride, carboxyalkyl, and vinyl groups; and crosslinked polydimethylsiloxane. The commercially available silicones selected possess, for example, a weight average molecular weight of from about 1,000 to about 200,000, while the commercially available crosslinked siloxanes utilized are believed to have a weight average molecular weight of from about 40,000 to about 1,000,000.

In addition, various exemplary embodiments of a powder coating composition used in the process of the invention may be formulated in accordance with normal practice and, in particular, it is possible to use compositions formulated especially for corona-charging application as well as compositions formulated especially for tribo-charging application (for example, for the latter, by the use of suitable polymers of which the so-called "tribo-safe" grades are an example or by the use of additives).

The latex emulsion of resin, together with any additives, are then subjected to an aggregation process, wherein the latex emulsion of resin and optional additives are allowed to aggregate to form aggregate particles. The latex emulsion of resin and optional additives may be mixed by any suitable method, including but not limited to agitation. The latex emulsion of resin and optional additives mixture may be heated, preferably to a temperature at or below the glass transition temperature of the at least one resin, to aggregate the particles. However, aggregation can also be achieved without heating the composition.

It may be necessary to introduce an aggregating agent into the mixture to cause aggregation. Where necessary, the total amount of aggregating agent required for the aggregation is from, for example, about 5% to about 20% by weight of resin in the emulsion. The aggregating agent is preferably added as a solution in water, the solution containing on the order of, for example, about 1% to about 20% by weight of the aggregating agent.

In various exemplary embodiments of the present invention, dilute solutions of aggregating agent are used to optimize particle aggregation time with as little fouling and coarse particle formation as possible. For example, fouling may be decreased to <0.1% when a 1% to 10%, preferably 3% to 5%, zinc acetate solution is used as the aggregating agent solution. Thus, the aggregating agent solution preferably contains 5% by weight or less aggregating agent, preferably 3% by weight or less. Further, it may be possible to add a dip tube into the vessel in order to reduce foaming and more intimately mix the aggregating agent with the resin particles, and thus further eliminate fouling.

Any aggregating agent capable of causing complexation might suitably be used. Both alkali earth metal or transition metal salts can be utilized as aggregating agents. Examples of the alkali (II) salts that can be selected to aggregate the sodio sulfonated polyester colloid with a colorant to enable the formation of the toner composite are preferably selected from beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, and barium iodide. Examples of transition metal salts or anions include acetates, acetoacetates, sulfates of vanadium, niobium, tantalum, chromium, molybdenum, tungsten, manganese, iron, ruthenium, cobalt, nickel, copper, zinc, cadmium, silver or aluminum salts such as aluminum acetate, polyaluminum chloride, aluminum halides, mixtures thereof and the like, and wherein the concentration thereof is optionally in the range of from about 0.1 to about 5 weight percent by weight of water. Preferred aggregating agents are zinc acetate and polyaluminum chlorides.

Following addition of the aggregating agent into the vessel, the aggregation step conditions may be continued for a period of time until powder coating composition particles of the desired size and size distribution are obtained. The size may be monitored by taking samples from the vessel and evaluating the size of the powder coating composition particles, for example with a particle sizing apparatus. In various exemplary embodiments of the invention, the aggregate particles have volume average diameter of less than 30 microns, preferably from about 3 to about 20 microns and more preferably from about 3 to about 10 microns, and narrow GSD of, for example, from about 1.10 to about 1.25, preferably from about 1.10 to about 1.20, as measured by a particle sizing apparatus, such as a particle sizing apparatus which makes use of the Coulter principle, such as a COULTER COUNTER, can be obtained.

Once the aggregate particles reach the desired size, the resulting suspension is allowed to coalesce. This may be achieved by heating to a temperature at or above the glass transition temperature of the resin.

These particles can be removed from the suspension, such as by filtration, and subjected to washing/rinsing with, for example, water to remove residual aggregating agent, and drying, whereby there are obtained powder coating composition particles comprised of resin and optionally additives, such as colorants and curing agents. In addition, the powder coating composition particles may be subjected to screening and/or filtration steps to remove undesired coarse particles from the powder coating composition.

In this way a powder may be formed. Resin is generally present in the powder in any sufficient, but effective amount. In various exemplary embodiments of the invention, resin is present in an amount of from about 50 to about 100 percent by weight of a powder coating composition. In various exemplary embodiments of the invention, resin is present in an amount of from about 70 to about 90 percent by weight of the powder coating composition.

In various exemplary embodiments of the invention, the powder coating composition may incorporate, for example by dry-blending, one or more additive, such as fluidity-assisting additives, for example, those disclosed in WO 94/11446, and especially the preferred additive combination disclosed in that Specification, comprising aluminum oxide and aluminum hydroxide. Other dry-blended additives and surface additives that may be mentioned include curing agents; fillers such as aluminum oxide and silica, either singly or in combination; flow-promoting and flow-control agents, and charge additives, such as those described above. In addition, other additives may be included.

The powder compositions of the present invention may also optionally be blended with flow-promoting and flow-control agents, such as external additive particles, which are usually present on the surface of the powder compositions. Examples of these additives include, but are not limited to, metal oxides such as titanium oxide, tin oxide, mixtures thereof, and the like; colloidal silicas such as AEROSIL®; metal salts and metal salts of fatty acids including zinc stearate, aluminum oxides, cerium oxides; and mixtures thereof.

These flow-aid agents are generally present in amounts of from about 0.1 percent by weight to about 5 percent by weight, and preferably in amounts of from about 0.1 percent by weight to about 1 percent by weight. Several of the aforementioned additives are illustrated in U.S. Pat. No. 3,590,000, the disclosure of which is totally incorporated herein by reference.

The total content of dry-blended additive(s) incorporated with the powder coating composition will in general be in the range of from 0.01% to 10% by weight preferably at least 0.1% by weight and not exceeding 1.0% by weight (based on the total weight of the composition without the additive(s)). However, higher or lower amounts of additives may also be used.

Surface additives may be added to the powder coating composition particles after isolation by, for example, filtration, and then optionally followed by washing and drying. Suitable external surface additives include, for example, metal salts, metal salts of fatty acids, colloidal silicas, titanium oxides, mixtures thereof, and the like, which additives are usually present in an amount of from about 0.1 to about 2 weight percent, reference U.S. Pat. Nos. 3,590,000; 3,720, 617; 3,655,374 and 3,983,045, the disclosures of which are totally incorporated herein by reference. These additives can be selected in amounts of, for example, from about 0.1 to about 2 percent, and which additives can be incorporated during the aggregation, or blended into the formed powder coating composition. The powder coating composition may also include known charge additives in effective amounts of, for example, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of each of these patents being totally incorporated herein by reference, negative charge enhancing additives like aluminum complexes, and the like. Other known positive and negative enhancing charge additives may also be selected.

The powder coating compositions prepared by various embodiments of the invention can be used for known powder coating techniques. The powder coating compositions obtained are especially useful in powder coating methods such as, for example, the electrostatic spray processes and fluidized-bed processes described above, as well as other powder coating methods currently known or later discovered. The powder coating compositions may be loaded into a suitable container for transport to and use in any selected powder coating method.

The substrate may comprise metal (for example, aluminum or steel) or another conductive material, and may in principle be of any desired shape and size. Advantageously, the substrate is chemically or mechanically cleaned prior to application of the composition, and, in the case of metal substrates, is preferably subjected to chemical pre-treatment, for example, with iron phosphate, zinc phosphate or chromate.

Once applied to the substrate in powder form by any of the known or later developed methods of powder coating, the powder coating composition formed by the methods of various exemplary embodiments of the invention can be cured by any suitable method, including but not limited to exposure of the coated substrate to heat, ultraviolet radiation and light.

The invention accordingly provides a process for coating automotive components, in which a first coating derived from a powder coating composition is applied by means of the process of the invention as herein defined, and thereafter a topcoat is applied over the powder coating. Mention should also be made of applications of the process of the invention in the aerospace industry, where it is of particular advantage to be able to apply uniform coatings at minimum film weights to substrates (especially aluminum or aluminum-alloy substrates) of a wide range of geometric configurations in an environmentally-compliant manner.

The process of the invention is capable of dealing with articles such as wire baskets and freezer shelves which include welds and projections, providing a uniform coating of powder on the welds and projections as well as on the remainder of the articles. Alternative coating processes, in contrast, may be expected to yield non-uniform coatings on articles such as wire baskets and freezer shelves since, with the alternative coating processes, adequate covering of welds is often achieved only with over-covering of the projections.

Specific examples will now be described in detail. These examples are intended to be illustrative, and the invention is not limited to the materials, conditions, or process parameters set forth in these embodiments. All parts and percentages are by weight unless otherwise indicated.

EXAMPLES

The following Examples are provided to further illustrate embodiments of the present invention.

Example I

Powder particles comprising 89% styrene-acrylate-based resin and 11% cyan Pigment Blue 15.3 pigment (available from Sun Chemicals) were prepared as follows:

(i) A latex emulsion comprised of polymer particles, generated from the emulsion polymerization of styrene, butyl acrylate and beta carboxylethyl acrylate, was prepared as follows:

A surfactant solution of 1.59 kilograms of DOWFAX 2A1™ (anionic emulsifier) and 430 kilograms of deionized water was prepared by mixing these components for 10 minutes in a stainless steel holding tank. The holding tank was then purged with nitrogen for 5 minutes before transferring the mixture into a reactor. The reactor was then continuously purged with nitrogen while the mixture was stirred at 100 rpm (revolutions per minute). The reactor was then heated up to 80° C. Separately, 6.8 kilograms of ammonium persulfate initiator were dissolved in 33.55 kilograms of deionized water.

Separately, a monomer emulsion was prepared in the following manner:

366 kilograms of styrene, 86 kilograms of butyl acrylate and 14 kilograms of β-CEA, 6 kilograms of 1-dodecanethiol, 3 kilograms of dodecanediol diacrylate (ADOD), 8.05 kilograms of DOWFAX™ (anionic surfactant), and 216 kilograms of deionized water were mixed to form an emulsion. 5% of the above latex emulsion was then slowly fed into the reactor containing the aqueous surfactant phase at 80° C. to form "seeds" while being purged with nitrogen. The initiator solution was then slowly charged into the reactor and after 10 minutes the rest of the emulsion was continuously fed into the reactor using metering pumps. Once all of the monomer emulsion was charged into the main reactor, the temperature was held at 80° C. for an additional 2 hours to complete the reaction. Full cooling was then applied and the reactor temperature was reduced to 35° C. The product was collected into a holding tank. After drying the latex resin molecular properties were $M_w$=60,000, $M_n$=11,800 and the onset Tg was 58.6° C. The latex was comprised of 40 percent resin, 58.5 percent water and 1.5 percent of anionic surfactant.

(ii) Preparation of Cyan Powder Composition 344.5 grams of the above prepared latex emulsion and 150 grams of an aqueous cyan pigment dispersion containing 49.8 grams of blue pigment Pigment Blue 15.3 (available from Sun Chemicals), having a solids loading of 35.5 percent, were simultaneously added to 540 milliliters of water at room temperature, about 25° C., while being mixed at a shear speed of 5,000 rpm by means of a polytron. To this mixture were added 26 grams of a polyaluminum chloride (PAC) solution containing 2.6 grams of 10 percent solids and 23.4 grams of 0.2 molar nitric acid, over a period of 2 minutes, and blended at speed of 5,000 rpm for a period of 2 minutes. The resulting mixture, which had a pH of 2.7, was then transferred to a 2 liter reaction vessel and heated at a temperature of 58° C. for 60 minutes resulting in aggregates of a size 6.5 and the GSD was 1.19. 1.6 grams of sulfonated 8-hydroxyquinoline were added to the resulting mixture followed by adjusting the pH from 2.7 to 7.9 and with aqueous base solution of 4 percent sodium hydroxide, and this mixture was allowed to stir for an additional 15 minutes. Subsequently, the resulting mixture was heated to 90° C. and retained there for a period of 1 hour. The pH of the resultant mixture was then lowered from about 7.6 to about 2.6 with 5 percent nitric acid. After 7 hours (total) at a temperature of 95° C., the particles were in the shape of spheres when observed under the optical microscope, and had a size of 6.5 microns with a GSD of 1.18. The reactor was then cooled down to room temperature and the particles were washed 4 times, where the first wash was conducted at a pH of 11, followed by 2 washes with deionized water, and a final wash accomplished at a pH of 2. The particles were then dried on a freeze dryer. The composite particles were comprised of 89 percent resin of latex (A) and 11 percent of the above cyan Pigment Blue 15.3 pigment.

Example II

A powder composition comprising 95% polyester resin and 6% Pigment Blue 15:3 colorant was prepared as follows:

(i) A polyester resin comprising 0.465 mol percent terephthalate, 0.035 mol percent sodium sulfoisophthalate, 0.475 mol percent 1,2-propanediol, and 0.025 mol percent diethylene glycol was prepared as follows:

In a 5-gallon Parr reactor equipped with a bottom drain valve, double turbine agitator, and distillation receiver with a cold water condenser, were charged 3.98 kilograms of dimethylterephthalate, 451 grams of sodium dimethyl sulfoisophthalate, 3.104 kilograms of 1,2-propanediol (1 mole excess of glycol), 351 grams of diethylene glycol (1 mole excess of glycol), and 8 grams of butyltin hydroxide oxide catalyst. The reactor was then heated to 165° C. with stirring for 3 hours whereby 1.33 kilograms of distillate were collected in the distillation receiver, and which distillate was comprised of about 98 percent by volume of methanol and 2 percent by volume of 1,2-propanediol as measured by the ABBE refractometer (available from American Optical Corporation). The reactor mixture was then heated to 190° C. over a one hour period, after which the pressure was slowly reduced from atmospheric pressure to about 260 Torr over a one hour period, and then reduced to 5 Torr over a two hour period with the collection of approximately 470 grams of distillate in the distillation receiver, and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 530 grams of 1,2-propanediol were collected. The reactor was then purged with nitrogen to atmospheric pressure, and the polymer product discharged through the bottom drain onto a container cooled with dry ice to yield 5.60 kilograms of 3.5 mol percent sulfonated polyester resin, sodio salt of (1,2-propylene-dipropylene-5-sulfoisophthalate)-copoly(1,2-propylene-dipropylene terephthalate). The sulfonated polyester resin glass transition temperature was measured to be 56.6° C. (onset) utilizing the 910 Differential Scanning Calorimeter (available from E.I. DuPont) operating at a heating rate of 10° C. per minute. The number average molecular weight was measured to be 3,250 grams per mole, and the weight average molecular weight was measured to be 5,290 grams per mole using tetrahydrofuran as the solvent.

A 15 percent solids concentration of colloidal sulfonate polyester resin dissipated in aqueous media was prepared by first heating about 2 liters of deionized water to about 85° C. with stirring, and adding thereto 300 grams of the sulfonated polyester resin obtained above, followed by continued heating at about 85° C., and stirring of the mixture for a duration of from about one to about two hours, followed by cooling to about room temperature, about 25° C. The colloidal solution of sodio-sulfonated polyester resin particles possessed a characteristic blue tinge and particle sizes in the range of from about 5 to about 150 nanometers, and typically in the range of 20 to 40 nanometers, as measured by the NiCOMP® particle sizer.

(ii) Preparation of Cyan Powder Coat

A 2-liter colloidal solution containing 15 percent by weight of the above sodio sulfonated polyester resin was charged into a 4-liter kettle equipped with a mechanical stirrer. To this was added 42 grams of a cyan pigment dispersion containing 30 percent by weight of Pigment Blue 15:3 (available from Sun Chemicals), and the resulting mixture was heated to 56° C. with stirring at about 180 to 200 revolutions per minute. To this heated mixture was then added dropwise 760 grams of an aqueous solution containing 5 percent by weight of zinc acetate dihydrate. The dropwise addition of the zinc acetate dihydrate solution was accomplished utilizing a peristaltic pump, at a rate of addition of approximately 2.5 milliliters per minute. After the addition was complete (about 5 hours), the mixture was stirred for an additional 3 hours. A sample (about 1 gram) of the reaction mixture was then retrieved from the kettle, and a particle size of 4.9 microns with a GSD of 1.18 was measured by COULTER COUNTER. The mixture was then allowed to cool to room temperature, about 25° C., and the product was filtered off through a 3 micron hydrophobic membrane cloth, and freeze-dried to yield the powder material.

Example III

A curable powder composition comprising 85% epoxy resin, 5% diacidimide curing agent, and 10% titanium oxide is prepared as follows:

To a 4-liter kettle equipped with a heating mantle, mechanical stirrer and distillation apparatus is added 3 liters of water and 3 grams of dodecylbenzene sulfonate. The mixture is heated to 65° C., and to this is added dropwise a solution comprised of 425 grams of epoxy resin 664 D (available from Dow Chemicals) dissolved into 1.5 liters of acetone. The acetone is collected in the distillation receiver, and the mixture is heated for an additional 3 hours to remove any residual acetone to result in a dispersion of epoxy resin in water with an average particle size of 150 nm. To this resin dispersion is then added 200 grams of titanium oxide dispersion (40% solids) (available from Sun Chemicals), and an aqueous dispersion of dicyandiamide is prepared by ball milling 4 grams of dicyandiamide in 100 grams of water containing 1% by weight of dodecybenzene sulfonate for three hours. The mechanical stirrer is then removed from the kettle, and replaced with a Brinkman homogenizer. To the mixture 12 grams of a polyaluminum chloride (PAC) solution containing 2.6 grams of 10 percent solids and 23.4 grams of 0.2 molar nitric acid, is added over a period of 2 minutes, and blended at speed of 5,000 rpm for a period of 2 minutes utilizing the homogenizer. The resulting mixture then displays a pH of 2.5 to 3.0. The homogenizer is the replaced by the mechanical agitator, and the mixture is stirred at 250 rpm. The mixture is then heated to a temperature of 58° C. for 60 minutes resulting in aggregates of a size of 6.5 microns and a GSD of 1.24. 1.5 grams of sulfonated 8-hydroxquinoline is then added to the resulting mixture followed by adjusting the pH to about 7.5 with an aqueous base solution of 4 percent sodium hydroxide, and this mixture is allowed to stir for an additional 15 minutes. Subsequently, the resulting mixture is heated to 80° C. and retained there for a period of 1 hour. The coalesced particles are then found to be in the shape of spheres when observed under the optical microscope, and have a size of about 7 microns with a GSD of 1.2. The reactor is then cooled down to room temperature and the particles are washed 3 times, where the first wash is conducted at a pH of 11, followed by 2 washes with deionized water, and a final wash is accomplished at a pH of 2. The particles are then dried in a freeze dryer to yield the powder coating material.

While this invention has been described in conjunction with the exemplary embodiments outlined above, various alternatives, modifications, variations, improvements, and/or substantial equivalents, whether known or that are, or may be, presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the systems, methods and devices according to this invention are intended to embrace all known or later-developed alternatives, modifications, variations, improvements, and/or substantial equivalents.

What is claimed is:

1. A process for powder coating, comprising applying a powder to a conductive surface or to a layer on said surface to form a coating on said surface or layer, wherein the powder has a geometric size distribution of about 1.10 to about 1.25 and is formed by aggregating and coalescing particles in an aqueous dispersion, said particles including resin particles, wherein the powder is heated to melt the powder onto said surface or layer, thereby forming said coating.

2. The process of claim 1, wherein said conductive surface is a metallic surface.

3. The process of claim 1, wherein said powder has a volume average diameter of less than or equal to about 30 microns.

4. The process of claim 3, wherein said powder has a volume average diameter of about 3 to about 20 microns.

5. The process of claim 1, wherein during said aggregating said resin particles are aggregated with colorant to form powder particles comprising at least one resin and at least one colorant.

6. The process of claim 5, wherein said at least one colorant is at least one pigment.

7. The process of claim 1, wherein during said aggregating said resin particles are aggregated with at least one of fillers and leveling agents to form powder particles comprising at least one resin and at least one of fillers and leveling agents.

8. The process of claim 1, wherein the resin particles comprise at least one resin selected from the group consisting of epoxy resins, polyester resins, acrylic resins, polyamide resins, polyolefin resins, plasticized polyvinyl chloride, polyester and poly (vinylidene fluoride), and ionomers, and copolymers and mixtures thereof.

9. The process of claim 1, wherein the resin particles comprise at least one curable resin.

10. The process of claim 9, wherein said powder further comprises at least one curing agent,
said process further comprising activating the curing agent to initiate curing of said powder, and allowing said powder to cure.

11. The process of claim 1, wherein the resin particles comprise at least one thermoset resin.

12. The process of claim 1, wherein the resin particles comprise at least one thermoplastic resin.

13. The process of claim 1, wherein the resin particles have a volume average diameter from about 5 to about 500 nm and wherein the resin particles compose about 5 to about 40 percent by weight of the aqueous dispersion.

14. The process of claim 1, wherein during said aggregating said resin particles are aggregated with at least one additive to form powder particles.

15. The process of claim 14, wherein the at least one additive is selected from the group consisting of magnetites, flocculates, charge additives, flow-promoting agents, flow-control agents, plasticizers, stabilizers, anti-gassing and degassing agents, antioxidants, UV absorbers, light stabilizers, waxes and mixtures thereof.

16. The process of claim 1, wherein the powder contains resin in an amount of from about 50 to about 100 percent by weight and the powder contains colorant in an amount of from about 1 to about 20 percent by weight.

17. The process of claim 1, wherein the aggregating is accomplished at a temperature below the glass transition temperature of the resin particles.

18. The process of claim 1, wherein the aggregating is accomplished at a temperature of from about 25° C. to about 60° C.

19. The process of claim 1, wherein the aggregating is accomplished at a temperature of from about 1° C. to about 25° C. below the glass transition temperature of the resin particles.

20. The process of claim 1, wherein the coalescing is accomplished at a temperature above the glass transition temperature of the resin particles.

21. The process of claim 1, wherein the coalescing is accomplished at a temperature of from about 70° C. to about 120° C.

22. The process of claim 1, wherein the coalescing is accomplished at a temperature in the range from about 5° C. to about 50° C. above the glass transition temperature of the resin particles.

23. A process for powder coating, comprising:
a) forming powder having a geometric size distribution of about 1.10 to about 1.25 by:
    i) aggregating, in an aqueous dispersion, particles including at least resin particles to form aggregated particles;
    ii) coalescing said aggregated particles to form fused particles; and
    iii) removing said fused particles from said aqueous dispersion to form said powder; and
b) applying said powder to a conductive surface or to a layer on said surface to form a coating on said surface or layer, wherein the powder is cured to form said coating or heated to melt said powder onto said surface or layer.

24. The process of claim 23, wherein, after removing said fused particles from said aqueous dispersion, said fused particles are dry-blended with at least one additional additive to form said powder.

25. The process of claim 24, wherein, the at least one additional additive is selected from the group consisting of surface additives, fluidity assisting additives, flow-promoting agents, flow-control agents, curing agents, fillers, charge additives and mixtures thereof.

26. A process, comprising applying a powder having a geometric size distribution of about 1.10 to about 1.25 over a conductive surface, wherein the powder is formed by aggregating and coalescing particles in an aqueous dispersion, wherein the powder is heated to melt the powder onto the conductive surface, thereby forming a coating on the conductive surface.

27. The process of claim 26, wherein the particles comprise styrene-acrylate resin.

28. The process of claim 26, wherein the particles comprise at least one colorant selected from the group consisting of cyan colorants, magenta colorants and yellow colorants.

* * * * *